United States Patent [19]

Wright et al.

[11] 3,909,479

[45] Sept. 30, 1975

[54] ACRYLIC DISPERSIONS CONTAINING ONLY NONFUNCTIONAL GROUPS

[75] Inventors: Howard J. Wright; Charles R. Van Horn, both of Kansas City, Mo.

[73] Assignee: Cook Paint & Varnish Company, North Kansas City, Mo.

[22] Filed: Aug. 16, 1971

[21] Appl. No.: 176,369

[52] U.S. Cl.... 260/33.6 UA; 260/34.2; 260/89.5 A; 260/851; 260/855; 260/856
[51] Int. Cl.²........................................... C08K 5/01
[58] Field of Search............ 260/34.2, 33.6 UA;851, 260/855, 856, 89.5 A

[56] References Cited
UNITED STATES PATENTS 3,183,282  5/1965  Harwitz................................ 260/856
3,365,414  1/1968  Fisk et al. ....................... 260/855 X Primary Examiner—Donald E. Czaja
Assistant Examiner—S. M. Person
Attorney, Agent, or Firm—Lowe, Kokjer, Kircher, Wharton & Bowman

[57] ABSTRACT

A process and composition for a stable polymer dispersion formed by copolymerizing vinyl monomers containing no functional OH and COOH groups in the presence of an alkylated melamine-formaldehyde reaction product dissolved in an aliphatic hydrocarbon in which the copolymer product is insoluble.

4 Claims, No Drawings

ACRYLIC DISPERSIONS CONTAINING ONLY NONFUNCTIONAL GROUPS

BACKGROUND AND SUMMARY OF THE INVENTION

This invention relates to film forming materials for use in coating compositions. More particularly, this invention concerns improved polymer dispersions stabilized in an aliphatic hydrocarbon by an alkylated amine-aldehyde reaction product.

Relevant to the present invention is Pat. No. 3,365,414 by Fisk et al., issued Jan. 23, 1968, entitled "Process for Making an Alkylated Melamine-Formaldehyde Stabilized Polymer Dispersion." This reference teaches copolymerizing a vinyl monomer which is free from functional OH or COOH groups with an acrylic or methacrylic monomer which has a functional —OH or —COOH group. The copolymerization is carried out in the presence of an alkylated melamine-formaldehyde product dissolved in an aliphatic hydrocarbon.

Therefore, in the above reference, as well as numerous other references in this art, it is seen that a functional group is a necessary limitation on at least one component of the copolymer system. The reasons for this requirement are many. Primarily, the functional group is needed for chemical bonding in the subsequent curing operations. In accounting for the reactivity of the dispersion copolymer, the functional groups also provide solvent resistivity and acid spot resistivity to the cured product.

A problem which has long plagued the industry, however, is the tendency of the dispersions of this genre to ripple when baked on a substrate. This phenomena, known in the art as "orange peel", severely diminishes the high gloss finish of a thermoset system. A primary object of this invention is to provide a solution for this vexing problem.

More particularly, an object of the invention is to provide an acrylic dispersion having superior rheological properties to achieve improved flow and gloss characteristics.

Another object of the invention is to provide an acrylic dispersion having superior rheological properties and to prevent premature curing which imparts an orange-peel effect to the final finish.

An additional object of the invention is to provide an acrylic dispersion for creating a satisfactory enamel which can be formulated by compensating for the loss of reactivity of the dispersion copolymer. This can be achieved at curing time by providing a solution vehicle containing the requisite reactivity.

Another object of the invention is to provide an acrylic dispersion having superior gloss characteristics than the dispersions heretofore known in this art.

A further object of the invention is to provide an acrylic dispersion exhibiting superior humidity whitening resistance properties.

Yet a further object of the invention is to provide an acrylic dispersion having an increased solids advantage over prior dispersions of this character.

Other and further objects of the invention, together with the features of novelty appurtenant thereto, will appear in the course of the following description.

DESCRIPTION OF THE INVENTION

We have discovered that a stable polymer dispersion may be formed from vinyl monomers which have no functional OH and COOH groups. The vinyl monomers selected for copolymerization are reacted in the presence of an alkylated amine-aldehyde reaction product so that the insoluble copolymer is associated with the amine-aldehyde and thus kept in a stabilized, finely dispersed state. The mechanism by which this phenomena occurs is not understood since it was heretofore thought that a functional group was necessary in order to effect copolymerization.

The amine-aldehyde used herein is preferably a butylated melamine-formaldehyde condensate, although the alkylated derivatives obtained with higher or lower alcohols than butanol, e. g., lauryl alcohol, can be advantageously used. Such condensates are well known in the coating art and conventional procedures may be used for preparing the same for use herein. Generally speaking, the alkylated melamine-formaldehyde condensates used in the present process are characterized by relatively high naphtha tolerances, i.e., in the excess of 15 and preferably in the order of 200 and above.

The solvent for the melamine-formaldehyde reaction product is essentially aliphatic hydrocarbon in which the copolymer components are insoluble. Aromatic solvents such as benzene, toluene, xylene or aromatic naphthas are not suitable for the present purposes. Advantageously, the solvent employed is selected from heptane, iso-octane, nonane, decane, cyclohexane, i.e., straight, branched or cyclic saturated aliphatic hydrocarbon solvents. Minor amounts of alkanols such as butyl up to lauryl alcohol may be included. The amount of solvent employed can be widely varied, but should be adequate to dissolve all the melamine-formaldehyde reaction product and provide an easily manageable polymerization medium.

With respect to the copolymer components, any vinyl monomer which is free from functional OH and COOH groups, or mixtures of such monomers, may be used. Typical examples of such monomers are the alkyl acrylates, alkyl methacrylates, styrene, alpha methyl styrene and acrylonitrile. Specific illustrations are the esters of methacrylic acid and acrylic acid with alkanols such as ethyl acrylate, 2-ethyl hexyl acrylate, butyl acrylate, methyl methacrylate, butyl methacrylate or the like.

The amount of melamine-formaldehyde condensate employed can be widely varied. Generally speaking, however, the amount of melamine-formaldehyde condensate to total copolymer components will be in the range of 5 to 50% condensate for 50 to 95% copolymer component, by weight.

The copolymerization of the invention is advantageously carried out by gradually adding the mixture of monomer components, along with a suitable free radical catalyst, to a heated solution of the alkylated melamine-formaldehyde condensate in a solvent as aforesaid. Representative catalysts for use herein include azobisisobutylnitrile, peroxides such as lauroyl peroxide and benzoyl peroxide, hydroperoxides, and the like. Polymerization temperatures and times may be widely varied depending on other conditions. However, temperatures in the range of 30°–85° C. and times varying from 1–10 hours or more may be mentioned as representative.

The dispersed polymer will usually have a molecular weight in the range of 50,000–150,000 although this can be varied as desired. The resulting dispersion, which may have a solids content of up to, for example, 50–60% solids, is highly useful for coating purposes where a thermoset system is desired.

The invention is further illustrated by the following examples wherein parts and percentages are by weight unless otherwise indicated:

EXAMPLE 1

Part A 17.2 parts melamine, 56.4 parts butyl formaldehyde solution (40%), 21.3 parts butanol, 5.05 parts xylene and 0.05 parts cobalt nitrate hexahydrate were heated to reflux. The mixture was held at reflux until a Gardner-Holdt viscosity of Y-Z was obtained. Solids of the resin were 72% and the ratio of formaldehyde to melamine was 5.5:1.

Part B 166.9 parts of the butylated melamine formaldehyde product was dissolved in a mixture of 307.0 parts heptane and 34.1 parts 2-ethoxyethyl acetate and heated to 90°C. under an inert gas atmosphere with stirring. A mixture of 408 parts methyl methacrylate, 24 parts alpha methyl styrene, 48 parts glycidyl methacrylate and 6 parts benzoyl peroxide was added over 3½ hours. The temperature was maintained at 90°C. for 2 hours and then cooled to room temperature. The resulting polymer dispersion was low in viscosity at 60% solids. When cast on a metal substrate and baked, the resulting film had useful properties as a coating vehicle.

EXAMPLE 2

140 parts of the product obtained under Part A of Example 1 was dissolved in 439 parts naphtha and purged with inert gas while heating to 90°C. A mixture consisting of 320 parts methyl methacrylate, 20 parts alpha methyl styrene, 40 parts glycidyl methacrylate, 20 parts acrylonitrile and 6 parts benzoyl peroxide was added over 3½ hours with good stirring. The temperature was maintained at 90°C. for an additional 2 hours and the resulting dispersion was then cooled to ambient temperature. A very limpid polymer dispersion resulted which was film-forming when cast on glass and baked.

EXAMPLE 3

Part A 184.8 parts melamine, 551.4 parts butyl formaldehyde solution (40%), 216.1 parts butanol, 0.05 parts cobalt nitrate and 47.6 parts xylene were brought to reflux in a stirred reaction vessel. Water was removed until the ASTM was 100–110. The viscosity of the resin was U-V at 68% non-volatile. The formaldehyde to melamine ratio is 5:1.

Part B 272.6 parts of the above product was dissolved in a mixture of 365.4 parts of aliphatic naphtha and 25.0 parts of n-butanol and heated to 90°C. in a stirred reaction vessel with a nitrogen atmosphere. A mixture consisting of 109.5 parts styrene, 23.2 parts butyl acrylate, 9.23 parts acrylonitrile and 6 parts benzoyl peroxide was added over 4½ hours. The product was held at 90°C. for 2 more hours and then cooled to room temperature. A dispersion of finely divided polymer particles which were capable of forming a film at room temperature when cast or sprayed on a substrate was the resulting product.

EXAMPLE 4

331.7 parts of the butylated melamine-formaldehyde resin mentioned in Example 3, Part A was dissolved in a solution of 327.3 parts naphtha and 25.0 parts butyl alcohol and purged with inert gas while heating to 90°C. A mixture of acrylic monomers consisting of 94.5 parts butyl methacrylate, 76.5 parts acrylonitrile, 82.5 parts styrene, 46.5 parts alpha methyl styrene and 10.0 parts benzoyl peroxide was added over 4½ hours while maintaining the temperature at 85°–90°C. The result was a low viscosity dispersion of acrylic polymer particles which was capable of forming a film on a substrate.

EXAMPLE 5

297.6 parts of the melamine-formaldehyde product cited in Part A of Example 1 was dissolved in 365.4 parts of naphtha and heated to 90° C. in a stirred reaction kettle. A mixture of 173.9 parts styrene, 39.0 parts acrylonitrile, 97.5 parts ethyl acrylate and 3.0 parts benzoyl peroxide was added over 3½ hours. The temperature was maintained for 2 more hours to ensure complete conversion and the product was cooled to room temperature. The resultant dispersion was very thin and watery and could be cast and baked to a glossy, clear film.

EXAMPLE 6

241.5 parts of the melamine formaldehyde resin prepared according to Part A of Example 1 was charged to a three-neck resin flask equipped with an efficient agitator, a dropping funnel, a thermometer and a source of inert gas. To this was added 417.9 parts of branched chain iso-paraffinic hydrocarbon and the mixture was heated to 90°–95°C. A mixture containing 162.5 parts of styrene, 162.5 parts of acrylonitrile and 6 parts of benzoyl peroxide was added over 4 hours, then held for an additional 2 hours to ensure complete polymerization. When cooled the resultant product was a thin, watery non-aqueous polymer dispersion, with a total solids content of 50% by weight, which produced a film when applied to a substrate and baked.

From the foregoing, it will be understood that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described our invention, We claim:

1. A process for creating a stable acrylic dispersion consisting of copolymerizing a monomer mixture of 22% styrene, 26% butyl methacrylate, 10% alpha methyl styrene, 20% acrylonitrile, and 22% ethyl methacrylate, in the presence of a solution of alkylated melamine-formaldehyde condensate dissolved in an essentially aliphatic hydrocarbon.

2. A process for creating a stable acrylic dispersion consisting of copolymerizing a monomer mixture of 27.5% styrene, 31.5% butyl methacrylate, 15.5% alpha methyl styrene, and 25.5% acrylonitrile, in the presence of a solution of alkylated melamine-formaldehyde condensate dissolved in an essentially aliphatic hydrocarbon.

3. A stable acrylic dispersion formed by the process consisting of copolymerizing a monomer mixture of 22% styrene, 26% butyl methacrylate, 10% alpha methyl styrene, 20% acrylonitrile, and 22% ethyl methacrylate, in the presence of a solution of alkylated melamine-formaldehyde condensate dissolved in an essentially aliphatic hydrocarbon.

4. A stable acrylic dispersion formed by the process consisting of copolymerizing a monomer mixture of 27.5% styrene, 31.5% butyl methacrylate, 15.5% alpha methyl styrene, and 25.5% acrylonitrile, in the presence of a solution of alkylated melamine-formaldehyde condensate dissolved in an essentially aliphatic hydrocarbon.

* * * * *